United States Patent
Lee et al.

(10) Patent No.: US 7,650,078 B2
(45) Date of Patent: Jan. 19, 2010

(54) FREQUENCY EXTRACTING APPARATUS AND SIGNAL EXTRACTING SYSTEM EMPLOYING THE SAME

(75) Inventors: Jaemyoung Lee, Seoul (KR); Je-Soo Ko, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 597 days.

(21) Appl. No.: 11/369,080

(22) Filed: Mar. 6, 2006

(65) Prior Publication Data

US 2007/0041734 A1 Feb. 22, 2007

(30) Foreign Application Priority Data

Aug. 17, 2005 (KR) ...................... 10-2005-0075232

(51) Int. Cl.
H04B 10/00 (2006.01)
(52) U.S. Cl. ........................ 398/158; 398/154; 398/159; 398/79; 398/84; 398/85; 398/87; 385/24; 385/37
(58) Field of Classification Search ................. 398/154, 398/79, 82, 84, 85, 155, 158, 159, 87, 83, 398/81; 385/24, 37
See application file for complete search history.

(56) References Cited

U.S. PATENT DOCUMENTS 7,133,615 B2 * 11/2006 Ogusu .......................... 398/79

7,260,126 B2 * 8/2007 Wang et al. .................... 372/30
7,327,957 B2 * 2/2008 Lee et al. ....................... 398/82

FOREIGN PATENT DOCUMENTS

| KR | 20010063062 A | 7/2001 |
|---|---|---|
| KR | 2003 0047966 | 6/2003 |
| KR | 10-2003-0086223 | 7/2003 |
| KR | 10-2004 0102941 | 12/2004 |

OTHER PUBLICATIONS

'Optical signal processing for very high speed (>40 Gbit/s) ETDM binary NRZ clock recovery' Franz, ALCATEL Corporate Research Center, Optical Systems and Networks, MG1-1 to MG1-3, 2000.

* cited by examiner

Primary Examiner—Hanh Phan
(74) Attorney, Agent, or Firm—Ladas & Parry LLP

(57) ABSTRACT

Provided are a frequency extracting apparatus and a signal extracting system employing the same. The signal extracting system can reduce the effect of an input signal pattern by extracting two frequency components and beating them to extract a desired clock signal, and improve a signal-to-noise ratio of an extracted clock signal. The frequency extracting apparatus includes: a circulator for changing an output direction of an input signal; a reflective filter for extracting a desired frequency component among frequency components of the input signal; a wavelength and amplitude controlling unit; and the frequency amplitude controller.

20 Claims, 3 Drawing Sheets

FREQUENCY EXTRACTING APPARATUS AND SIGNAL EXTRACTING SYSTEM EMPLOYING THE SAME

FIELD OF THE INVENTION

The present invention relates to a frequency extracting apparatus and a signal extracting system employing the same; and more particularly, to a frequency extracting apparatus that can precisely extract frequency components with desired amplitudes by using a Fabry-Perot Laser Diode (FP LD), and a signal extracting system that can reduce the pattern effect of an input signal by extracting two frequency components in use of the FP LDs of the frequency extracting apparatus and beating the two frequency components which are the output modes of FP LDs, that is, making the two frequency amplitudes have the same amplitude, to thereby extract a desired clock signal, and improve a signal-to-noise ratio of the extracted clock signal.

DESCRIPTION OF RELATED ART

Hereinafter, an apparatus and system for optically extracting a clock signal will be described as an example with reference to embodiments. However, the present invention is not limited to the example and the embodiments. That is, the apparatus and system of the present invention individually extracts predetermined two frequency components among various frequency components of an input signal and extracts a desired clock signal based on the two frequency components. In short, a clock signal can be recovered by extracting frequency components corresponding to the clock signal among various frequency components of an input signal.

Generally, improvement of transmission rate in an optical communication requires technological development in a transmission part transmitting desired data into optical signals and improvement of a signal processing rate in a receiving part restoring a received optical signal into the original signal. Optical clock extraction has been studied as a method to meet requirements of high speed optical communication at the receiving unit.

Currently, the optical clock extraction technologies include a self-pulsating method in a laser diode and an optical loop mirror method. However, it is difficult to realize systems for extracting a desired clock and the optical system is unstable, which remain unresolved so far.

One of solutions devised to resolve the problems is a method of restoring a clock signal by using frequency components existing in an optical spectrum. Here, clock components of the received signal are obtained by extracting two adjacent frequency components corresponding to a data transmission rate of the received signal, beating the two frequency components, and thereby forming a frequency component corresponding to a frequency difference between two spectral lines.

According to the conventional method, two frequency components in an optical spectrum are selected and they are made to have the same amplitude. Then, a clock signal of an input signal is obtained by beating the two frequency components.

Herein, to select the two frequency components, the conventional technology makes the two frequency components have the same amplitude by controlling a tunable band pass filter, which is shown in FIGS. 1A to 1C. FIG. 1A shows an optical spectrum of a signal before passing through the tunable band pass filter, and FIG. 1B shows an optical spectrum of a signal in the tunable band pass filter. FIG. 1C shows an optical spectrum of a signal after passing through the tunable band pass filter.

The conventional clock signal extracting method based on beating has a problem that the extracted clock signal is influenced by the pattern of an input signal greatly. In other words, there is a shortcoming that the clock signal components may disappear while the received data are consecutive '0' or '1' for a time.

SUMMARY OF THE INVENTION

It is, therefore, an object of the present invention to provide a frequency extracting apparatus for precisely extracting frequency components with desired bands and desired amplitudes by using Fabry-Perot Laser Diodes (FP LD).

It is another object of the present invention to provide a frequency extracting apparatus that can precisely extract frequency components with desired amplitudes by using the FP LDS after selecting a predetermined polarized light component among various frequency components of an input signal.

It is still another object of the present invention to provide a signal extracting system that can reduce the pattern effect of an input signal by extracting two frequency components in use of FP LDs of the frequency extracting apparatus, making the two frequency components output modes of the FP LD, that is, making the two frequency components have the same amplitude, and beating the two frequency components to thereby extract a desired signal, e.g., a clock signal, and simultaneously improve a signal-to-noise ratio of the extracted signal.

It is further still another object of the present invention to provide a signal extracting system that can reduce the pattern effect of an input signal by selecting polarization components among various frequency components of an input signal, extracting two frequency components in use of FP LDs of the frequency extracting apparatus, making the two frequency components output modes of the FP LD, that is, making the two frequency components have the same amplitude, and beating the two frequency components to thereby extract a desired signal, e.g., a clock signal, and simultaneously improve a signal-to-noise ratio of the extracted signal.

The other objects and advantages of the present invention will be understood by the following description and become more apparent by the preferred embodiments of the present invention. Also, the objects and advantages of the present invention can be easily realized by the means as claimed and combinations thereof.

In accordance with an aspect of the present invention, there is provided an apparatus for extracting frequency components, including: a rotating means for changing an direction of a signal; a frequency selecting means for extracting a desired frequency component among frequency components of the input signal transmitted from the rotating means and transmitting the desired frequency component to the rotating means; a wavelength and amplitude controlling means for controlling wavelength and amplitude of an output mode of a frequency amplitude controlling means; and the frequency amplitude controlling means for synchronizing wavelength of the output mode with the wavelength extracted in the frequency selecting means and transmitted from the rotating means, adjusting the amplitude of the frequency component, and outputting the frequency component with the adjusted amplitude through the rotating means.

The frequency extracting apparatus further includes: a polarization controlling means for selecting a predetermined polarization component among various frequency components of the input signal and transmitting the polarization component to the rotating means.

In accordance with another aspect of the present invention, there is provided a system for extracting a signal, including: a splitter for splitting a propagation path of an input signal to thereby produce a first split signal and a second split signal; a first circulator for changing an output direction of the first split signal of input signal obtained from the splitting of the splitter; a first reflective filter for selecting, i.e., extracting, a desired frequency component among frequency components of the first split signal of the input signal transmitted from the first circulator and transmitting the desired frequency component to the first circulator; a first wavelength and amplitude controlling unit for adjusting wavelength and amplitude of an output mode of a first frequency amplitude controller; the first frequency amplitude controller for synchronizing a wavelength of the output modes with the wavelength extracted from the first reflective filter and transmitted through the first circulator by adjusting the wavelength of the output mode according to a control signal transmitted from the first wavelength and amplitude controlling unit, adjusting the amplitude of the frequency component, and then transmitting the frequency component with the adjusted amplitude to the first circulator; a second circulator for changing an output direction of the second split signal of input signal obtained from the splitting of the splitter; a second reflective filter for extracting a desired frequency component among frequency components of the second split signal of the input signal transmitted from the second circulator and transmitting the desired frequency component to the second circulator; a second wavelength and amplitude controlling unit for changing wavelength and amplitude of an output mode of a second frequency amplitude controller; the second frequency amplitude controller for synchronizing a wavelength of the output modes with the wavelength extracted from the second reflective filter and transmitted through the second circulator by adjusting the wavelength of the output mode according to a control signal transmitted from the second wavelength and amplitude controlling unit, adjusting the amplitude of the frequency component, and then transmitting the frequency component with the adjusted amplitude to the second circulator; and a signal extracting unit for extracting a signal by beating the two frequency components transmitted from the first and second frequency amplitude controller, respectively.

The signal extracting system further includes: a polarization controller for selecting a predetermined polarization component among various frequency components of the input signal and transmitting the polarization component to the splitter.

The signal extracting system further includes: a first polarization controller for selecting a predetermined polarization component among various frequency components of the first split signal of the input signal which is obtained from the splitting of the splitter and transmitting the polarization component to the first splitter; and a second polarization controller for selecting a predetermined polarization component among various frequency components of the second split signal of the input signal which is obtained from the splitting of the splitter and transmitting the polarization component to the second splitter.

As described above, the frequency extracting apparatus of the present invention extracts a clock signal by using commonly-used FP LDs. In other words, the frequency extracting apparatus of the present invention utilizes two FP LDs and reflective filters to extract two frequency components, and the extracted frequency components are made to have the same amplitude by controlling the amount of current applied to the FP LDs and the temperature of the FP LDs. The two frequency components needed to restore a clock signal are obtained by splitting an input signal at a splitter for two paths, extracting frequency components in use of a reflective filter for each path, and applying them to the FP LDs. In order to restore the clock signal, the two frequency components are made to become output modes of the FP LDs the thereby have the same amplitude. Then, the produced two frequency components of the same amplitude go through beating at the receiver. The wavelength and amplitude of the two frequency components are controlled, by adjusting the amount of current applied to the FP LDs and/or the temperature of the FP LDs.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter. When it is determined that further description on prior art may blur the point of the present invention, the description will not be provided herein. Hereinafter, preferred embodiments of the present invention will be described in detail with reference to the accompanying drawings.

Figure 1:
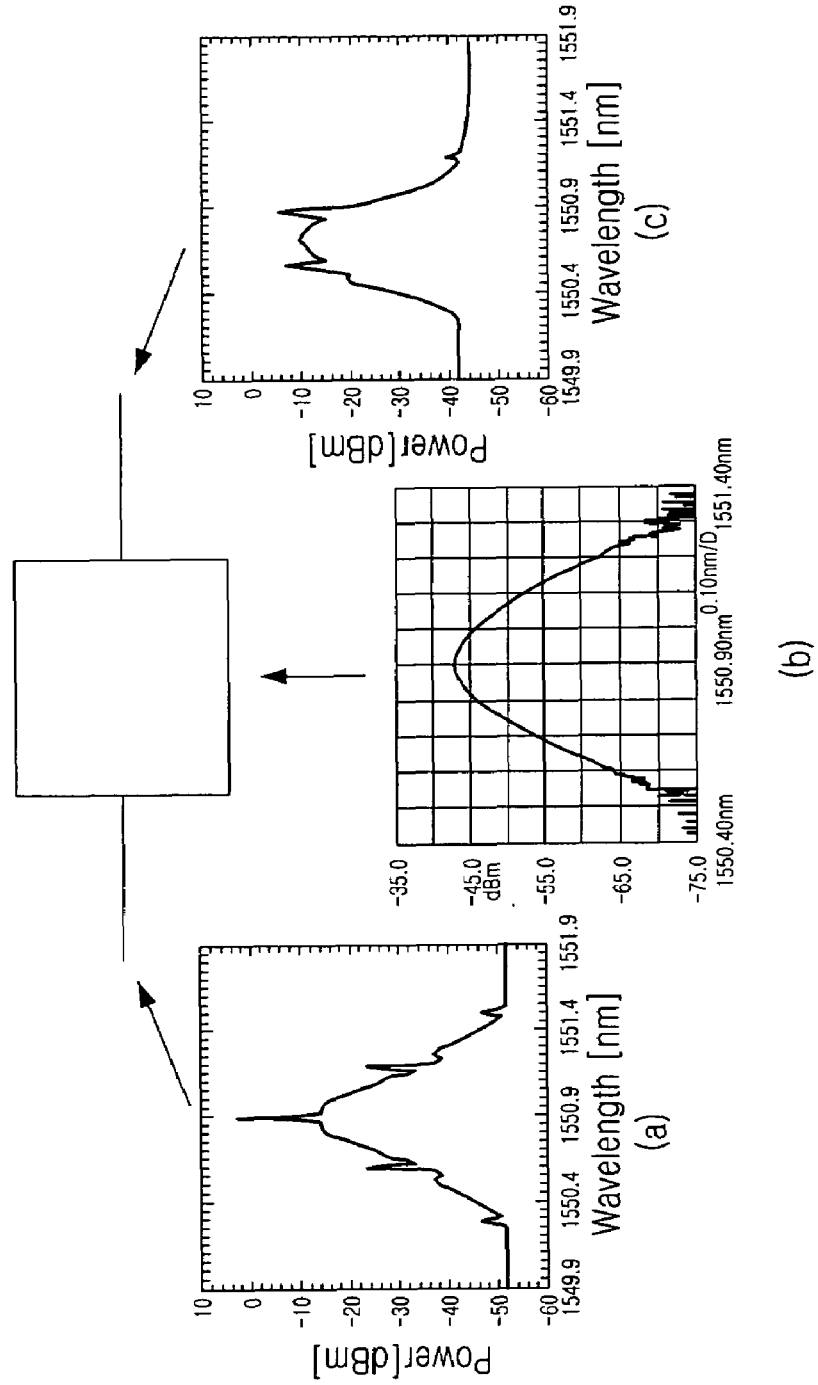
FIG. 1 is a diagram describing the concept of a conventional clock extracting apparatus using a tunable band-pass filter.
Figure 2:
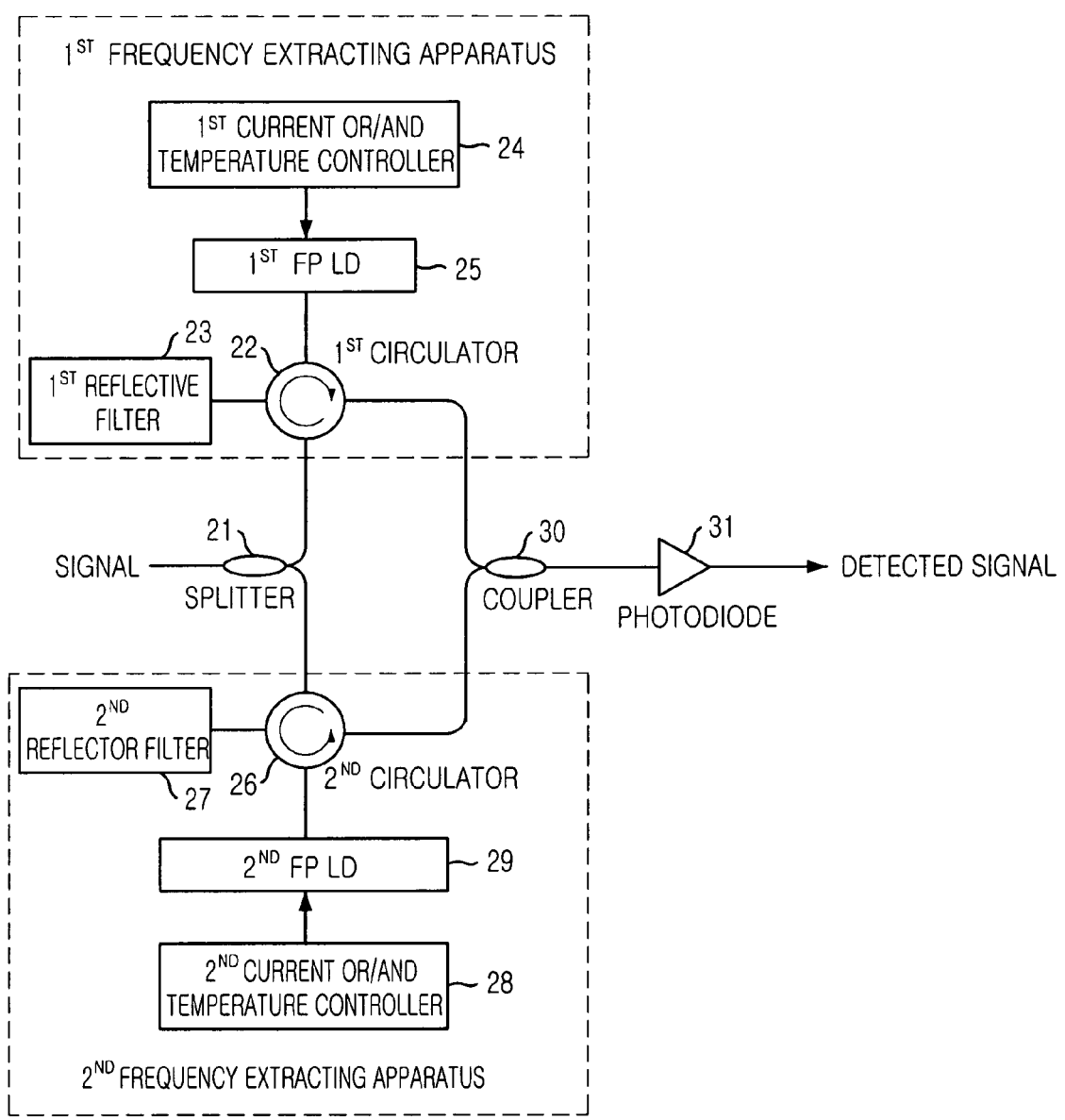
FIG. 2 is a block diagram showing a frequency extracting apparatus using Fabry-Perot Laser Diodes (FP LD) and a signal extracting system employing the frequency extracting apparatus in accordance with an embodiment of the present invention.

FIG. 2 is a block diagram showing a frequency extracting apparatus using Fabry-Perot Laser Diodes (FP LDs) and a signal extracting system employing the frequency extracting apparatus in accordance with an embodiment of the present invention.

First, the principles of the present invention will be described herein.

Generally, a Non-Return-to-Zero (NRZ) signal does not have a clock component but an optically modulated NRZ signal includes the clock components. In the present invention, a clock signal is restored by using the clock component existing in the optically modulated NRZ signal. The present invention adopts a method of beating two frequency components to obtain the clock signal from the NRZ signal. One of the problems of the conventional clock signal extraction based on beating is that the pattern of an input signal affects the extracted clock signal significantly. In other words, when data are formed of consecutive '0' or '1', there is a shortcoming that a clock signal component may disappear. On the contrary, in the clock signal extraction using Fabry-Perot Laser Diodes (FP LDs), which is suggested in the present invention, the pattern of the input signal scarcely affects the extracted clock signal or the influence of the pattern on the extracted clock signal is reduced.

The amplitude of a clock component in an optical spectrum is relatively small, compared to the amplitude of the center frequency component. Thus, the two signals should be made to have the same amplitude in order to make the amplitude of the clock signal obtained from the beating of the two signals larger than the amplitude of surrounding noise signals.

Herein, the two frequency components can have the same amplitude by adjusting the amount of current applied to the FP LDs 25 and 29 and/or the temperature of the FP LDs 25 and 29 to thereby change wavelength into a desired frequency and amplitude.

To be specific, optical spectra obtained from the FP LDs are generally different from each other because of the difference in the current amount applied to the FP LDs. Therefore, the current amount for the FP LDs is controlled in the present invention to control the amplitude of the two frequency components. The wavelengths of output modes of FP LDs are mainly controlled according to the current amount, and are also changed by the temperature control.

Also, whereas the amplitudes of the two frequency components can be made equal by controlling the current amount, the wavelength characteristics in the optical spectrum are controlled mainly by adjusting the temperature of the FP LDs. Since a change in the temperature can change the amplitude of frequency slightly, the change in the temperature can be used to make the two frequency components of the input signal have the same amplitude. It is, of course, possible to realize the frequency extracting apparatus of the present invention to be controlled by adjusting both current and temperature or either current or temperature.

Hereinafter, the structures and operations of the frequency extracting apparatus using FP LDs and a signal extracting system using the frequency extracting apparatus will be described in detail.

As illustrated in FIG. 2, the frequency extracting apparatus using FP LDs includes circulators 22 and 26, reflective filters 23 and 27, current and/or temperature controllers 24 and 28, and FP LDs 25 and 29.

The circulators 22 and 26 change the output direction of an optical input signal. The reflective filters 23 and 27 extract desired frequency components among the frequency components of the optical input signal transmitted from the circulators 22 and 26 and transmit the extracted frequency component back to the circulators 22 and 26. The current and/or temperature controllers 24 and 28 adjust the wavelength and amplitude of output modes of the FP LDS 25 and 29 by controlling the amount of current applied to the FP LDS 25 and 29 and/or the temperature of the FP LDs 25 and 29. The FP LDs 25 and 29 synchronize the wavelengths of output modes of the FP LD with those of the frequencies extracted from the reflective filters 23 and 27 and transmitted through the circulators 22 and 26 by changing the wavelength of the output mode according to control signals, which adjust a current and/or temperature, transmitted from the current and/or temperature controllers 24 and 28; adjust the amplitudes of the frequency components; and send the adjusted frequency components back to the circulators 22 and 26.

As shown in FIG. 2, the signal extracting system employing the frequency extracting apparatus using the FP LDs includes: a splitter 21, a first circulator 22, a first reflective filter 23, a first current and/or temperature controller 24, a first FP LD 25, a second circulator 26, a second reflective filter 27, a second current and/or temperature controller 28, a second FP LD 29, a coupler 30, and a photodiode 31.

The splitter 21 separates an input signal inputted from an external device and sends split signals into two paths, respectively.

The first circulator 22 changes the output direction of one of the input signal obtained from the splitting of the splitter 21.

The first reflective filter 23 extracts a desired frequency component among the frequency components of the one of the input signal transmitted from the first circulator 22 and transmits the extracted frequency component back to the first circulator 22.

The first current and/or temperature controller 24 changes the wavelength and amplitude of an output mode of the first FP LD 25 by adjusting the amount of current applied to the first FP LD 25 and/or temperature of the first FP LD 25.

The first FP LD 25 synchronizes the wavelength of the output mode with that of the wavelength selected, i.e., extracted, in the first reflective filter 23 and transmitted through the first circulator 22 by changing the wavelength of the output mode based on a control signal, which controls the current and/or temperature, transmitted from the first current and/or temperature controller 24; adjusts the amplitude of the frequency component; and transmits the obtained frequency component back to the first circulator 22.

The second circulator 26 changes the output direction of the other of the input signal obtained from the splitter 21.

The second reflective filter 27 extracts a desired frequency component among the frequency components of the other of the input signal transmitted from the second circulator 26 and transmits the extracted frequency component back to the second circulator 26.

The second current and/or temperature controller 28 changes the wavelength and amplitude of the output mode of the second FP LD 29 by adjusting the amount of current applied to the second FP LD 29 and/or the temperature of the FP LD 29.

The second FP LD 29 synchronizes wavelengths of the output modes with that of the frequency selected in the second reflective filter 27 and transmitted through the second circulator 26 by changing the wavelength of the output mode based on a control signal, which manages the current and/or temperature, transmitted from the second current and/or temperature controller 28; adjusts the amplitude of the frequency component; and transmits the frequency component back to the second circulator 26.

The coupler 30 couples the two frequency components with the same amplitude which are transmitted from the first and second FP LDs 25 and 29, respectively.

The photodiode 31 detects the two frequency components with the same amplitude which are transmitted from the coupler 30 and outputs a signal. Through the detection, the two frequency components are automatically beaten.

Subsequently, the operation and embodiments of each constitutional element will be described in detail.

First, the splitter 21 receives an optically modulated NRZ signal from a transmission line and splits it into two paths. Preferably, the input signal is split into two signals 50:50 for two paths and the two signals are inputted into the first and second circulators 22 and 26, respectively.

The first and second circulators 22 and 26 receive the signals inputted from the splitter 21 change the directions of the two signals and output them toward the first and second reflective filters 23 and 27, respectively. The reflective filters 23 and 27 extract frequency components and send them back to the first and second circulators 22 and 26.

The first and second circulators 22 and 26 transmit the frequency components reflected in the first and second reflective filters 23 and 27 to the first and second FP LDs 25 and 29. The first and second FP LDs 25 and 29 receive the frequency components extracted in the first and second reflective filters 23 and 27 through the corresponding first and second circulators 22 and 26. Herein, the first and second FP LDs 25 and 29 synchronize the wavelengths of output modes with the wavelengths extracted from the reflective filters 23 and 27 by changing the wavelengths of the output modes according to control signals, which control the current and/or temperature, transmitted from the first and second current and/or temperature controllers 24 and 28; and adjust the amplitudes of the frequency components extracted from the first and second reflective filters 23 and 27 according to the current amount and/or temperature controlled by the first and second current and/or temperature controllers 24 and 28. This is a first frequency amplitude control. Also, as the wavelengths of the output modes of the first and second FP LD 25 and 29 become the same as the wavelengths extracted by the first and second reflective filters 23 and 27, the amplitudes of the frequencies selected by the first and second reflective filters 23 and 27 are adjusted based on injection locking. This is a second frequency amplitude control. Herein, the injection locking is a function of amplifying and outputting a frequency component corresponding to an injected frequency.

The first and second FP LDs 25 and 29 transmit the frequency components, which come to have the same amplitude through the first and second frequency control processes, to the photodiode 31 through the coupler 30. In the first and second frequency control processes, the amplitudes of the frequencies are made the same primarily by adjusting the amount of current applied to the first and second FP LDs 25 and 29 and adjusting temperature secondarily.

The first and second frequency control processes should be performed because, to restore the signal, two frequency components are selected, made to have the same amplitude, and then beaten in the photodiode in the present invention 31.

Figure 3:
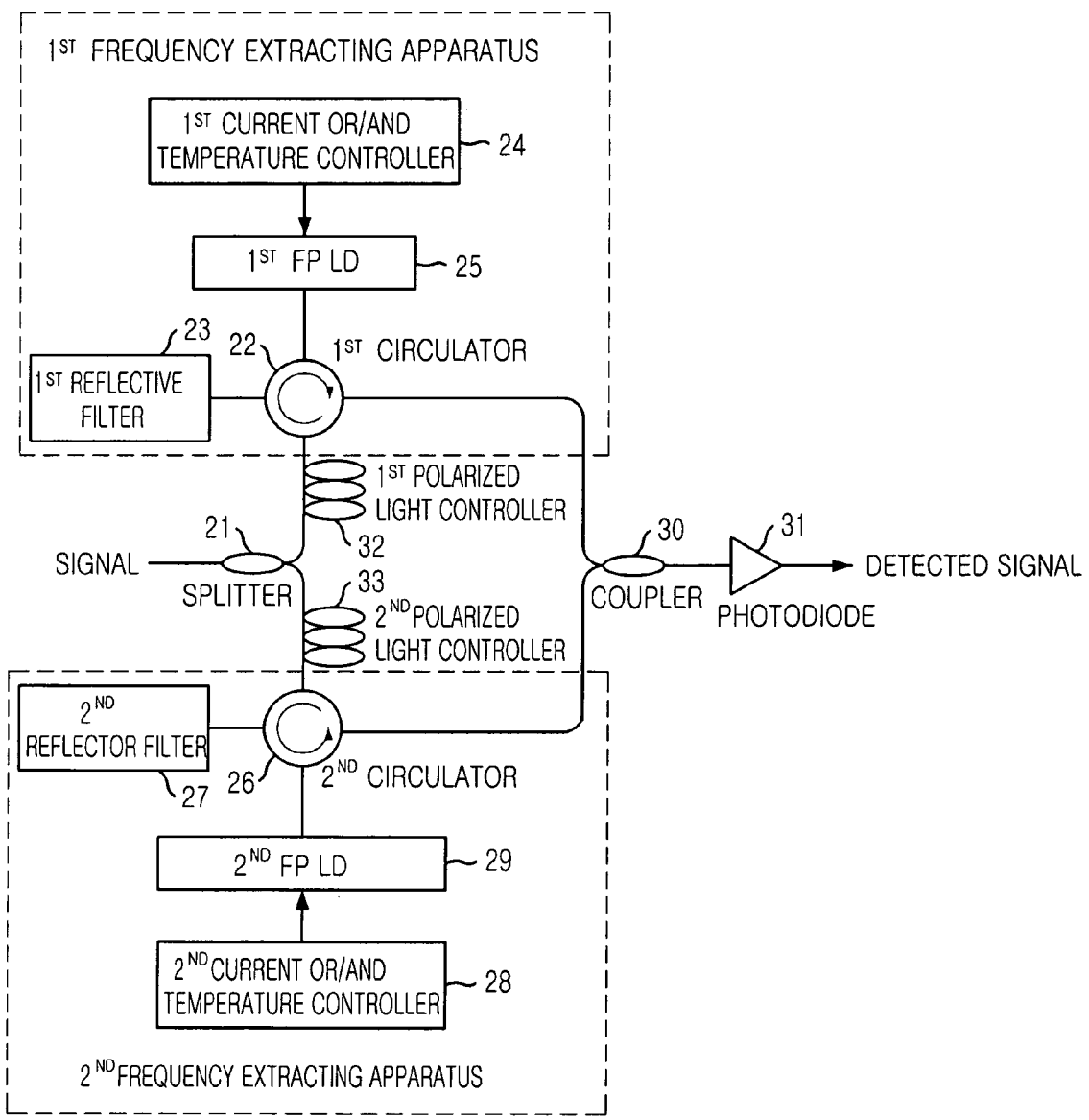
FIG. 3 is a block diagram showing a frequency extracting apparatus employing a polarization controller and FP LDs and a signal extracting system employing the frequency extracting apparatus in accordance with an embodiment of the present invention.

FIG. 3 is a block diagram showing a frequency extracting apparatus employing a polarization controller and FP LDs and a signal extracting system employing the frequency extracting apparatus in accordance with an embodiment of the present invention.

Generally, an input signal has a predetermined bandwidth and various polarization components. Therefore, when the above-described processes are performed on a particular polarization component, the frequency bandwidth is narrowed. Thus improved performance is obtained.

For example, as illustrated in FIG. 3, the frequency extracting apparatus can further include first and second polarization controllers 32 and 33 to select particular polarization components among the frequency components of an input signal obtained from the splitting in the splitter 21 and transmit them to the corresponding first and second circulators 22 and 26. Since the other operation is as described above, further description on it will not be provided herein.

As another example, it is possible to form a frequency extracting apparatus with the polarization controller not in the rear part of the splitter 21 but in the front part.

The frequency extracting apparatus of the present invention can precisely extract frequency components with desired amplitudes by using FP LDS.

Also, the apparatus of the present invention can precisely extract frequency components with amplitudes by using FP LDs after selecting a particular polarization components among various frequency components of an input signal.

The technology of the present invention can reduce the pattern effect of an input signal by extracting two frequency components in use of the FP LDs of the frequency extracting apparatus and making the two frequency components be the output modes of the FP LDs, that is, making the two frequency components have the same amplitude, and beating the two frequency components to thereby extract a desired signal, e.g., a clock signal, and improve a signal-to-noise ratio of the extracted signal.

Also, the technology of the present invention can reduce the pattern effect of an input signal by selecting one polarization component among various frequency components of an input signal, extracting two frequency components in use of the FP LDs of the frequency extracting apparatus and making the two frequency components be the output modes of the FP LDs, that is, making the two frequency components have the same amplitude, and beating the two frequency components to thereby extract a desired signal, e.g., a clock signal, and improve a signal-to-noise ratio of the extracted signal.

The present application contains subject matter related to Korean patent application No. 2005-0075232, filed with the Korean Intellectual Property Office on Aug. 17, 2005, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. An apparatus for extracting a frequency, comprising:
   a rotating unit receiving an input signal and changing an output direction of the input signal to transmit the input signal to a frequency selecting unit;
   the frequency selecting unit receiving the input signal transmitted from the rotating unit, extracting a desired frequency component among frequency components of the input signal transmitted from the rotating unit, and transmitting the desired frequency component back to the rotating unit;
   a wavelength and amplitude controlling unit controlling wavelength and amplitude of an output mode of a frequency amplitude controlling unit; and
   the frequency amplitude controlling unit synchronizing wavelengths of the output modes with the wavelength extracted in the frequency selecting unit and transmitted from the rotating unit, adjusting the amplitude of the frequency component, and outputting the frequency component with the adjusted amplitude through the rotating unit.

2. The apparatus as recited in claim 1, wherein the frequency amplitude controlling unit is a Fabry-Perot Laser Diode (FP LD).

3. The apparatus as recited in claim 2, wherein the FP LD receives a signal of the frequency component extracted from the frequency selecting unit from the rotating unit,
   synchronizes the wavelength of the output mode with the wavelength extracted in the frequency selecting unit by adjusting the wavelength of the output mode based on a control signal transmitted from the wavelength and amplitude controlling unit, and adjusts the amplitude of the frequency component extracted from the frequency selecting unit based on a control signal from the wavelength and amplitude controlling unit, and
   adjusts amplitude of the frequency component extracted from the frequency selecting unit based on injection locking, while the wavelength of the output mode is the same as the wavelength extracted in the frequency selecting unit.

4. The apparatus as recited in claim 3, wherein the wavelength and amplitude controlling unit changes the wavelength and amplitude of the frequency of the output mode of the FP LD by adjusting an amount of current applied to the FP LD and temperature of the FP LD.

5. The apparatus as recited in claim 3, wherein the wavelength and amplitude controlling unit changes the wavelength and amplitude of the frequency of the output mode of the FP LD by adjusting an amount of current applied to the FP LD.

6. The apparatus as recited in claim 3, wherein the wavelength and amplitude controlling unit changes the wavelength and amplitude of the output mode of the FP LD by adjusting temperature of the FP LD.

7. The apparatus as recited in claim 1, further comprising:
a polarization controlling unit selecting a predetermined polarization component among various frequency components of the input signal and transmitting the polarization component to the rotating unit.

8. The apparatus as recited in claim 7, wherein the frequency selecting unit is a reflective filter.

9. A system for extracting a signal, comprising:
a splitting means for splitting a propagation path of an input signal to thereby produce a first split signal and a second split signal;
a first rotating means for changing an output direction of the first split signal of input signal obtained from the splitting of the splitting means;
a first frequency selecting means for extracting a desired frequency component among frequency components of the first split signal of the input signal transmitted from the first rotating means and transmitting the desired frequency component to the first rotating means;
a first wavelength and amplitude controlling means for adjusting wavelength and amplitude of an output mode of a first frequency amplitude controlling means;
the first frequency amplitude controlling means for synchronizing wavelengths of the output modes with the wavelength extracted from the first frequency selecting means and transmitted through the first rotating means by adjusting the wavelength of the output mode according to a control signal transmitted from the first wavelength and amplitude controlling means, adjusting the amplitude of the frequency component, and then transmitting the frequency component with the adjusted amplitude to the first rotating means;
a second rotating means for changing an output direction of the second split signal of input signal obtained from the splitting of the splitting means;
a second frequency selecting means for extracting a desired frequency component among frequency components of the second split signal of the input signal transmitted from the second rotating means and transmitting the desired frequency component to the second rotating means;
a second wavelength and amplitude controlling means for adjusting wavelength and amplitude of an output mode of a second frequency amplitude controlling means;
the second frequency amplitude controlling means for synchronizing wavelengths of the output modes with the wavelength extracted from the second frequency selecting means and transmitted through the second rotating means by adjusting the wavelength of the output mode according to a control signal transmitted from the second wavelength and amplitude controlling means, adjusting the amplitude of the frequency component, and then transmitting the frequency component with the adjusted amplitude to the second rotating means; and a signal extracting means for extracting a signal by beating the two frequency components transmitted from the first and second frequency amplitude controlling means, respectively.

10. The system as recited in claim 9, wherein the first and second frequency amplitude controlling means are first and second FP LDs.

11. The system as recited in claim 9, further comprising:
a polarization controlling means: for selecting a predetermined polarization component among various frequency components of the input signal and transmitting the polarization component to the splitting means.

12. The system as recited in claim 9, further comprising:
a first polarization controlling means for selecting a predetermined polarization component among various frequency components of the first split signal of the input signal which is obtained from the splitting of the splitting means and transmitting the polarization component to the first splitting means; and
a second polarization controlling means for selecting a predetermined polarization component among various frequency components of the second split signal of the input signal which is obtained from the splitting means and transmitting the polarization component to the second splitting means.

13. The system as recited in claim 9, wherein the first and second frequency selecting means are first and second reflective filters.

14. The system as recited in claim 10, wherein the first FP LD receives a signal of the frequency component extracted in the first frequency selecting means through the first rotating means,
synchronizes wavelengths of the output modes with the wavelength extracted in the first frequency selecting means by adjusting the wavelength of the output mode according to a control signal transmitted from the first wavelength and amplitude controlling means,
adjusts amplitude of the frequency extracted by the first frequency selecting means according to a control signal transmitted from the first wavelength and amplitude controlling means, and
adjusts the amplitude of the frequency extracted by the first frequency selecting means based on injection locking, while the wavelength of the output mode is that same as the wavelength extracted by the first frequency selecting means; and
wherein the second FP LD receives a signal of the frequency component extracted in the second frequency selecting means through the second rotating means,
synchronizes wavelengths of the output modes with the wavelength extracted in the second frequency selecting means by adjusting the wavelength of the output mode according to a control signal transmitted from the second wavelength and amplitude controlling means,
adjusts amplitude of the frequency extracted by the second frequency selecting means according to a control signal transmitted from the second wavelength and amplitude controlling means, and
adjusts the amplitude of the frequency extracted by the second frequency selecting means based on injection locking, while the wavelength of the output mode is the same as the wavelength extracted by the second frequency selecting means.

15. The system as recited in claim 14, wherein the first wavelength and amplitude controlling means adjusts the wavelength and amplitude of the output mode of the first FP LD by adjusting the amount of current applied to the first FP LD and the temperature of the first FP LD, and the second wavelength and amplitude controlling means adjusts the wavelength and amplitude of the output mode of the second FP LD by adjusting the amount of current applied to the second FP LD and the temperature of the second FP LD.

16. The system as recited in claim 14, wherein the first wavelength and amplitude controlling means adjusts the wavelength and amplitude of the output mode of the first FP LD by adjusting the amount of current applied to the first FP LD, and the second wavelength and amplitude controlling means adjusts the wavelength and amplitude of the output mode of the second FP LD by adjusting the amount of current applied to the second FP LD.

17. The system as recited in claim 14, wherein the first wavelength and amplitude controlling means adjusts the wavelength and amplitude of the output mode of the first FP LD by adjusting the temperature of the first FP LD, and the second wavelength and amplitude controlling means adjusts the wavelength and amplitude of the output mode of the second FP LD by adjusting the temperature of the second FP LD.

18. A system for extracting a signal, comprising:

a splitting unit splitting a propagation path of an input signal to thereby produce a first split signal and a second split signal;

a first rotating unit changing an output direction of the first split signal of input signal obtained from the splitting of the splitting unit;

a first frequency selecting unit extracting a desired frequency component among frequency components of the first split signal of the input signal transmitted from the first rotating unit and transmitting the desired frequency component to the first rotating unit;

a first wavelength and amplitude controlling unit adjusting wavelength and amplitude of an output mode of a first frequency amplitude controlling unit;

the first frequency amplitude controlling unit synchronizing wavelengths of the output modes with the wavelength extracted from the first frequency selecting unit and transmitted through the first rotating unit by adjusting the wavelength of the output mode according to a control signal transmitted from the first wavelength and amplitude controlling unit, adjusting the amplitude of the frequency component, and then transmitting the frequency component with the adjusted amplitude to the first rotating unit;

a second rotating unit changing an output direction of the second split signal of input signal obtained from the splitting of the splitting unit;

a second frequency selecting unit extracting a desired frequency component among frequency components of the second split signal of the input signal transmitted from the second rotating unit and transmitting the desired frequency component to the second rotating unit;

a second wavelength and amplitude controlling unit adjusting wavelength and amplitude of an output mode of a second frequency amplitude controlling unit;

the second frequency amplitude controlling unit synchronizing wavelengths of the output modes with the wavelength extracted from the second frequency selecting unit and transmitted through the second rotating unit by adjusting the wavelength of the output mode according to a control signal transmitted from the second wavelength and amplitude controlling unit, adjusting the amplitude of the frequency component, and then transmitting the frequency component with the adjusted amplitude to the second rotating unit; and a signal extracting unit extracting a signal by beating the two frequency components transmitted from the first and second frequency amplitude controlling unit, respectively.

19. The system as recited in claim 18, wherein the first and second frequency amplitude controlling unit are first and second FP LDs.

20. The system as recited in claim 19, wherein the first FP LD receives a signal of the frequency component extracted in the first frequency selecting unit through the first rotating unit, synchronizes wavelengths of the output modes with the wavelength extracted in the first frequency selecting unit by adjusting the wavelength of the output mode according to a control signal transmitted from the first wavelength and amplitude controlling unit, adjusts amplitude of the frequency extracted by the first frequency selecting unit according to a control signal transmitted from the first wavelength and amplitude controlling unit, and adjusts the amplitude of the frequency extracted by the first frequency selecting unit based on injection locking, while the wavelength of the output mode is that same as the wavelength extracted by the first frequency selecting unit; and wherein the second FP LD receives a signal of the frequency component extracted in the second frequency selecting unit through the second rotating unit, synchronizes wavelengths of the output modes with the wavelength extracted in the second frequency selecting unit by adjusting the wavelength of the output mode according to a control signal transmitted from the second wavelength and amplitude controlling unit, adjusts amplitude of the frequency extracted by the second frequency selecting unit according to a control signal transmitted from the second wavelength and amplitude controlling unit, and adjusts the amplitude of the frequency extracted by the second frequency selecting unit based on injection locking, while the wavelength of the output mode is the same as the wavelength extracted by the second frequency selecting unit.

* * * * *